United States Patent
Iyer et al.

(10) Patent No.: US 9,357,578 B2
(45) Date of Patent: May 31, 2016

(54) FAST RECOVERY MECHANISMS FOR MULTI-CARRIER ENABLED UES

(71) Applicant: QUALCOMM Incorporated, San Diego, CA (US)

(72) Inventors: Ashish Shankar Iyer, San Diego, CA (US); Srinivasan Rajagopalan, San Diego, CA (US); Daniel Amerga, San Diego, CA (US); Srivatsa Venkata Chivukula, San Diego, CA (US); Kiran Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/320,291

(22) Filed: Jun. 30, 2014

(65) Prior Publication Data

US 2015/0004981 A1 Jan. 1, 2015

Related U.S. Application Data

(60) Provisional application No. 61/841,784, filed on Jul. 1, 2013.

(51) Int. Cl.
*H04W 36/00* (2009.01)
*H04W 76/02* (2009.01)

(52) U.S. Cl.
CPC .......... *H04W 76/025* (2013.01); *H04W 76/028* (2013.01)

(58) Field of Classification Search
CPC .................................. H04W 36/0027
USPC ............................... 455/437, 550.1
See application file for complete search history.

(56) References Cited

FOREIGN PATENT DOCUMENTS

GB 2475130 A 5/2011

OTHER PUBLICATIONS

ISA/EPO, International Search Report and Written Opinion of the International Searching Authority, Int'l App. No. PCT/US2014/045014, Mar. 3, 2015, European Patent Office, Rijswijk, NL 8 pgs.

*Primary Examiner* — David Q Nguyen
(74) *Attorney, Agent, or Firm* — Holland & Hart LLP

(57) ABSTRACT

Methods, systems, and devices are described for recovery from a connection disruption of a user equipment (UE) operating in a multi-carrier mode. The UE may establish a first connection with a primary cell and a second connection with a secondary cell while operating in the multi-carrier mode. A determination may be made that a disruption in the connection with the primary cell has occurred, and the UE may perform a connection reestablishment procedure to attempt to reestablish communications. The connection reestablishment routine may prioritize the secondary cell ahead of one or more other cells for attempting to reestablish communications. The prioritization may be based at least in part on the establishment of the second connection in the multi-carrier mode.

26 Claims, 11 Drawing Sheets

FAST RECOVERY MECHANISMS FOR MULTI-CARRIER ENABLED UES

CROSS REFERENCES

The present Application for patent claims priority to U.S. Provisional Patent Application No. 61/841,784 by Iyer et al., entitled "Fast Recovery Mechanisms for CA Enabled UE's," filed Jul. 1, 2013, and assigned to the assignee hereof.

BACKGROUND

The following relates generally to wireless communication, and more specifically to recovery from a disruption of a user equipment wireless connection when operating in a multi-carrier mode. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In some implementations, a user equipment (UE) may be capable of operating in a multi-carrier mode, in which two or more component carriers may be used for communication between the UE and one or more base stations. In the event that a disruption in communications using one or more of the component carriers is encountered, UEs may execute an established routine to reestablish communications with one or more base stations. Efficient reestablishment is desirable in order to reduce disruptions in service to the UE.

SUMMARY

The described features generally relate to one or more improved systems, methods, and/or apparatuses for reestablishment of communications following a connection disruption in a user equipment (UE) operating in a multi-carrier mode. The UE may establish a first connection with a primary cell and a second connection with a secondary cell while operating in the multi-carrier mode. A determination may be made that a disruption in the connection with the primary cell has occurred. The UE may attempt to reestablish communications and prioritize the secondary cell ahead of one or more other cells in a connection reestablishment procedure, the prioritization based at least in part on the establishment of the second connection in the multi-carrier mode.

In one aspect of the disclosure, a method of wireless communication by a user equipment (UE) in a wireless communication system is provided. The method generally includes establishing a first connection with a primary cell and a second connection with a secondary cell in a multi-carrier mode, determining that a disruption in the connection with the primary cell has occurred, and prioritizing the secondary cell ahead of one or more other cells in a connection reestablishment procedure responsive to the determination, the prioritization based at least in part on the establishment of the second connection in the multi-carrier mode. The prioritizing may include, for example, adding a frequency and cell ID of the secondary cell to an acquisition database of the UE following the establishment of the second connection with the secondary cell. In some examples, a system information block (SIB) of the secondary cell is not read by the UE prior to the addition of the secondary cell to the acquisition database. The second connection with the secondary cell may be established, for example, through a multi-carrier command received at the UE.

Additionally or alternatively, the method may include determining, prior to the prioritizing, that the secondary cell is operated by the same operator as the primary cell, wherein the determining is a precondition of the prioritizing. In some examples, the UE assumes that the secondary cell is operated by the same operator as the primary cell. The establishing connections may include, for example, establishing connections with two or more secondary cells in multi-carrier mode, and the prioritizing may include prioritizing one or more of the secondary cells ahead of one or more other cells in the connection reestablishment procedure. The method, in such examples, may further include adding a frequency and cell ID of each secondary cell to an acquisition database of the UE following the establishment of the connections with the secondary cells. A system information block (SIB) of the secondary cells, in some examples, is not read by the UE prior to the addition of the secondary cells to the acquisition database. In further examples, the method may also include releasing the connection with one of the secondary cells, and removing the frequency and cell ID of the released secondary cell from the acquisition database.

According to some examples, the method may also include adding a frequency and cell ID of the secondary cell to an acquisition database of the UE following the establishment of the second connection with the secondary cell, and prioritizing cells in the acquisition database for connection reestablishment attempts. The acquisition database may include, for example, a primary cell acquisition database and a secondary cell acquisition database, and cells in the primary cell acquisition database may be prioritized ahead of cells in the secondary cell database. In other examples, the cells in the secondary cell acquisition database may be prioritized ahead of cells in the primary cell database. Additionally or alternatively, cells in the acquisition database may be prioritized according to a signal strength associated with each cell.

In another aspect, an apparatus for wireless communication by a UE in a wireless communication system is disclosed. The apparatus generally includes means for establishing a first connection with a primary cell and a second connection with a secondary cell in a multi-carrier mode, means for determining that a disruption in the connection with the primary cell has occurred, and means for prioritizing the secondary cell ahead of one or more other cells in a connection reestablishment procedure responsive to the determination, the prioritization based at least in part on the establishment of the second connection in the multi-carrier mode. The means for prioritizing may include, for example, means for adding a frequency and cell ID of the secondary cell to an acquisition database of the UE following the establishment of the second connection with the secondary cell. In some examples, a system information block (SIB) of the secondary cell is not read by the UE prior to the addition of the secondary cell to the acquisition database. In some examples, the apparatus may also include means for determining, prior to the prioritizing, that the secondary cell is operated by the same operator as the primary cell, the determining being a precondition of the prioritizing. In other examples, the UE may assume that the secondary cell is operated by the same operator as the primary cell.

In some examples, the means for establishing connections may include means for establishing connections with two or more secondary cells in multi-carrier mode, and the means for prioritizing may include means for prioritizing one or more of the secondary cells ahead of one or more other cells in the connection reestablishment procedure. The apparatus may also include, for example, means for adding a frequency and cell ID of each secondary cell to an acquisition database of the UE following the establishment of the connections with the secondary cells. In some examples, a system information block (SIB) of the secondary cells may not be read by the UE prior to the addition of the secondary cells to the acquisition database. The apparatus of some examples may further include means for releasing the connection with one of the secondary cells, and means for removing the frequency and cell ID of the released secondary cell from the acquisition database.

In some examples, the apparatus may also include means for adding a frequency and cell ID of the secondary cell to an acquisition database of the UE following the establishment of the second connection with the secondary cell, and the means for prioritizing may include means for prioritizing cells in the acquisition database for connection reestablishment attempts. The acquisition database in such examples may include a primary cell acquisition database and a secondary cell acquisition database, and cells in the primary cell acquisition database may be prioritized ahead of cells in the secondary cell database, or cells in the secondary cell acquisition database may be prioritized ahead of cells in the primary cell database. In some examples, cells in the acquisition database may be prioritized according to a signal strength associated with each cell.

In another aspect, the present disclosure provides an apparatus for wireless communication in a wireless communication system. The apparatus generally includes a processor, a memory in electronic communication with the processor, and instructions being stored in the memory. The instructions may be executable by the processor to establish a first connection with a primary cell and a second connection with a secondary cell in a multi-carrier mode, determine that a disruption in the connection with the primary cell has occurred, and prioritize the secondary cell ahead of one or more other cells in a connection reestablishment procedure responsive to the determination, the prioritization based at least in part on the establishment of the second connection in the multi-carrier mode.

In a further aspect, a computer program product for wireless communication in a wireless communication system is provided. The computer program product generally includes a non-transitory computer-readable medium storing instructions executable by a processor to establish a first connection with a primary cell and a second connection with a secondary cell in a multi-carrier mode, determine that a disruption in the connection with the primary cell has occurred, and prioritize the secondary cell ahead of one or more other cells in a connection reestablishment procedure responsive to the determination, the prioritization based at least in part on the establishment of the second connection in the multi-carrier mode.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
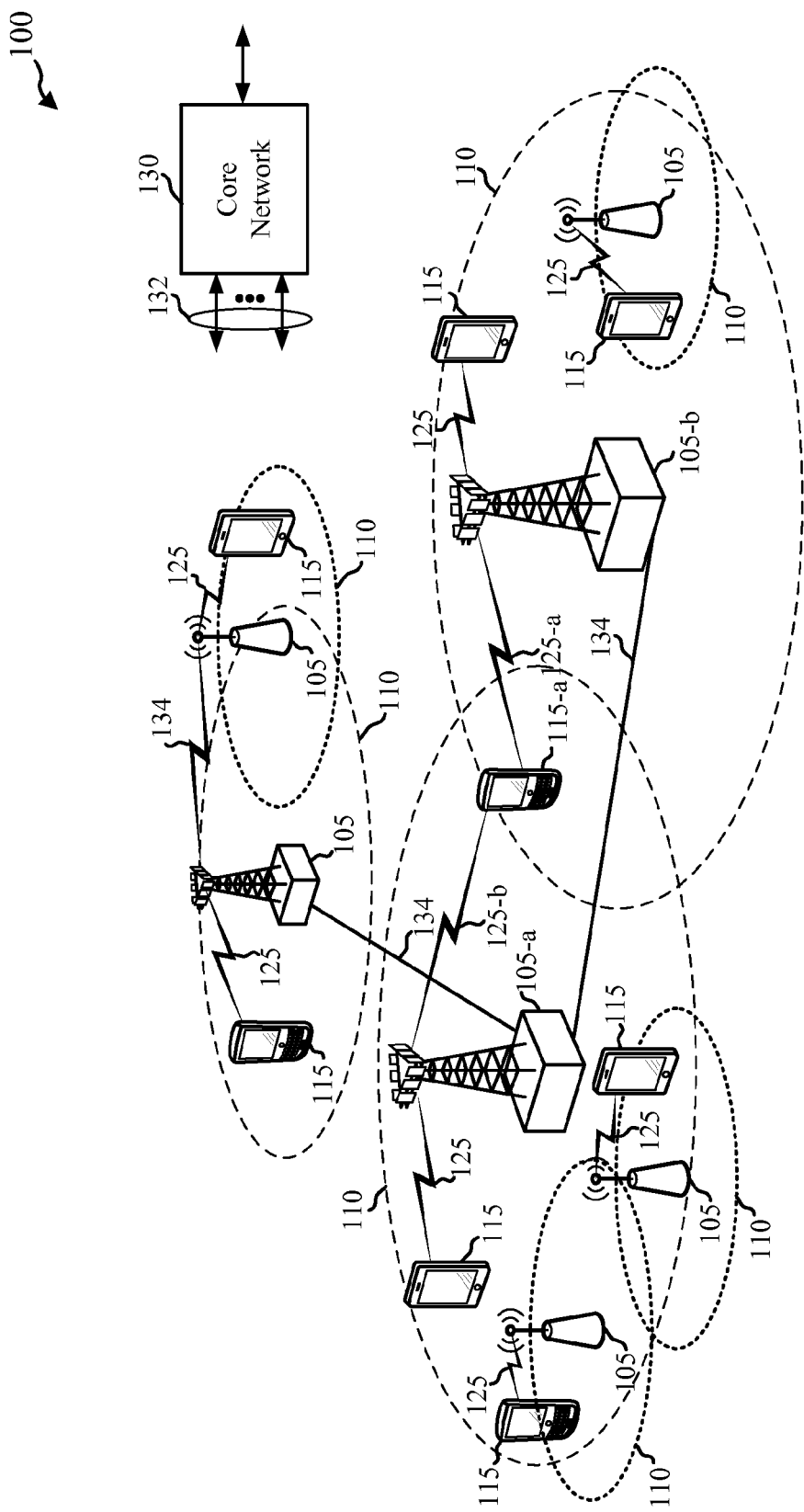
FIG. 1 shows a block diagram of a wireless communications system, in accordance with aspects of the present disclosure.

Various aspects of the disclosure provide for wireless communications in which a user equipment (UE) operating in a multi-carrier mode may recover from a connection disruption of a component carrier. The UE may establish a first connection with a primary cell and a second connection with a secondary cell while operating in multi-carrier mode. A determination may be made that a disruption in the connection with the primary cell has occurred, and the UE may perform a connection reestablishment procedure to attempt to reestablish communications. According to various examples, the connection reestablishment routine may prioritize the secondary cell ahead of one or more other cells for attempting to reestablish communications. The prioritization may be based at least in part on the establishment of the second connection in the multi-carrier mode. For example, the UE may determine that the primary cell is not available for communications and, upon determining the primary cell is no longer available, attempt to establish a connection using the secondary cell before attempting to establish a connection with other cells that may be available to the UE.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The communications system 100 includes base stations 105, communication devices 115, and a core network 130. The base stations 105 may communicate with the communication devices 115 under the control of a base station controller (not shown), which may be part of the core network 130 or the base stations 105 in various examples. Base stations 105 may communicate control information and/or user data with the core network 130 through backhaul links 132. Backhaul links may be wired backhaul links (e.g., copper, fiber, etc.) and/or wireless backhaul links (e.g., microwave, etc.). In examples, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The communications system 100 may include base stations 105 of different types (e.g., macro, micro, and/or pico base stations). A base station 105 may include one or more cells operating on one or more carriers. There may be overlapping coverage areas for different technologies.

The base stations 105 may wirelessly communicate with the devices 115 via one or more base station antennas. Each of the base station 105 sites may provide communication coverage for a respective geographic area 110. In some examples, a device may communicate with a base station 105 in a multi-carrier mode. In the example of FIG. 1, device 115 is illustrated as being in communication with base station 105 through communication link 125. The communication link 125 may include multiple carriers to facilitate operation of the multi-carrier mode. In other examples, a device 115 may be within a coverage area of two or more base stations 105, and may communicate with multiple base stations 105 in the multi-carrier mode. In the example of FIG. 1, device 115-a is illustrated as being within coverage areas 110 of base station 105-a and base station 105-b, and in communications with base station 105-a and base station 105-b through communication links 125-a and 125-b, respectively. Each of the communication links 125-a and 125-b may include one or more different carriers to facilitate operation of the multi-carrier mode. In the event of a disruption in one of the communications links 125-a, according to some examples, the device 115-a may attempt to reestablish communications using communications link 125-b. Various examples of such reestablishment procedures will be described in more detail below.

The communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. In examples, some base stations 105 may be synchronous while other base stations 105 may be asynchronous.

The devices 115 are dispersed throughout the wireless network 100, and each device may be stationary or mobile. A device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A device 115 may be a cellular phone, a personal digital assistant (PDA), a wireless modem, a wireless communication device, a handheld device, a tablet computer, a laptop computer, a cordless phone, a wireless local loop (WLL) station, or the like. A device 115 may be able to communicate with macro base stations, pico base stations, femto base stations, relay base stations, and the like.

The transmission links 125 shown in network 100 may multiple include uplink (UL) transmissions operating on multiple carriers from a mobile device 115 to a base station 105, and/or multiple downlink (DL) transmissions operating on multiple carriers, from a base station 105 to a mobile device 115. The downlink transmissions may also be called forward link transmissions while the uplink transmissions may also be called reverse link transmissions.

In some examples, the communications system 100 is an LTE/LTE-A network. In LTE/LTE-A networks, the terms evolved Node B (eNB) and user equipment (UE) may be generally used to describe the base stations 105 and devices 115, respectively. The communications system 100 may be a Heterogeneous LTE/LTE-A network in which different types of eNBs provide coverage for various geographical regions. For example, each eNB may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). A base station 105 for a macro cell may be referred to as a macro eNB. A base station 105 for a pico cell may be referred to as a pico eNB. And, a base station 105 for a femto cell may be referred to as a femto eNB or a home eNB. A base station 105 may support one or multiple (e.g., two, three, four, and the like) cells.

The communications system 100 according to an LTE/LTE-A network architecture may be referred to as an Evolved Packet System (EPS). The EPS may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, EPS may interconnect with a UTRAN-based network and/or a CDMA-based network via one or more Serving GPRS Support Nodes (SGSNs). To support mobility of UEs 115 and/or load balancing, the EPS may support handover of UEs 115 between a source eNB and a target eNB. The EPS may support intra-RAT handover between base stations 105 of the same RAT (e.g., other E-UTRAN networks), and inter-RAT handovers between base stations 105 of different RATs (e.g., E-UTRAN to CDMA, etc.). The EPS may provide packet-switched services, however, as those skilled in the art will readily appreciate, the various concepts presented throughout this disclosure may be extended to networks providing circuit-switched services.

The E-UTRAN may include the base stations 105 and may provide user plane and control plane protocol terminations toward the UEs 115. The base stations 105 may be connected to other base stations 105 via an X2 interface (e.g., backhaul link 134). The base stations 105 may provide an access point to the EPC for the UEs 115. The base stations 105 may be connected by an S1 interface (e.g., backhaul link 132) to the EPC. Logical nodes within EPC may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations 105 and/or multiple antennas on the UE 115 to take advantage of multipath environments to transmit multiple data streams. CoMP includes techniques for dynamic coordination of transmission and reception by a number of base stations 105 to improve overall transmission quality for UEs 115 as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between the UE 115 and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Communications system 100, as mentioned above, may support operation on multiple carriers, which may be referred to as carrier aggregation (CA) or a multi-carrier mode. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for the multi-carrier mode. The UE 115 may receive data and control information on one or more downlink CCs from one or more base stations 105. For example, a base station 105 may transmit data and control information on one or more downlink CCs to the UE 115. Alternatively or in addition, multiple base stations 105 may transmit data and control information on multiple downlink CCs to the UE 115. The UE 115 may transmit data and control information on one or more uplink CCs to one or more base stations 105. For example, a base station 105 may receive data and control information on one or more uplink CCs from the UE 115. Alternatively or in addition, multiple base stations 105 may receive data and control information on multiple uplink CCs from the UE 115.

The carriers may transmit bidirectional communications FDD (e.g., paired spectrum resources), TDD (e.g., unpaired spectrum resources). Frame structures for FDD (e.g., frame structure type 1) and TDD (e.g., frame structure type 2) may be defined. Each frame structure may have a radio frame length $T_f=307200 \cdot T_s=10$ ms and may include two half-frames of length $153600 \cdot T_s=5$ ms each. Each half-frame may include five subframes of length $30720 \cdot T_s=1$ ms.

Figure 2:
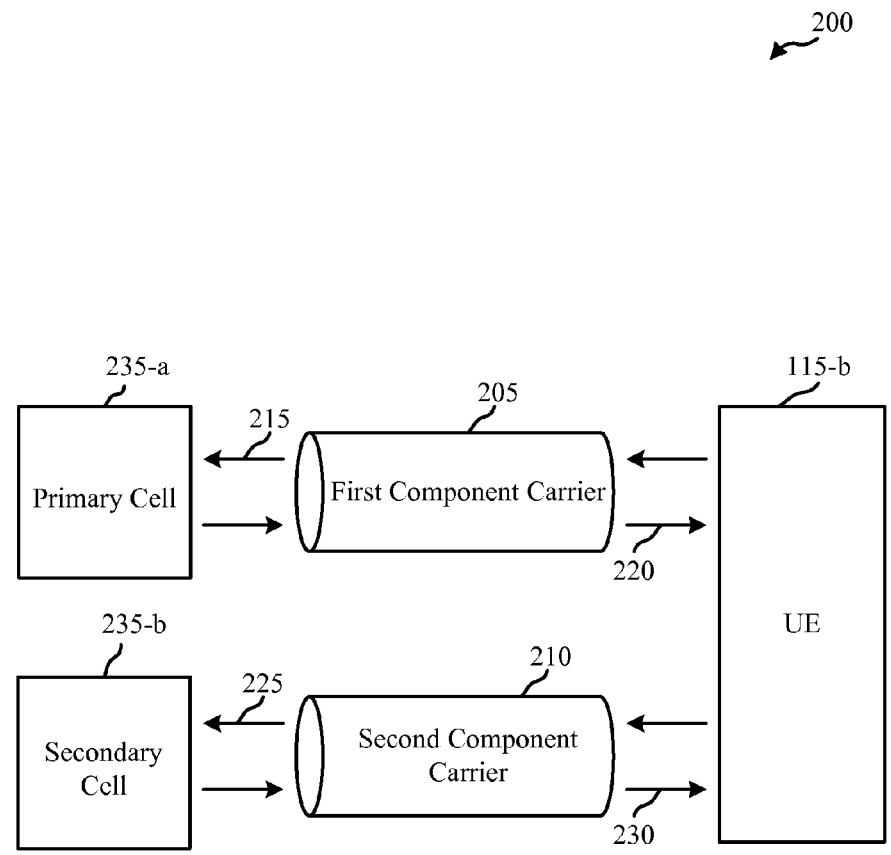
FIG. 2 shows a block diagram of an exemplary wireless communications system operating an a multi-carrier mode, in accordance with aspects of the present disclosure.

FIG. 2 shows a block diagram of a communications system 200 that may operate according to multi-carrier techniques. The system 200 includes a UE 115-b in communication with a primary cell 235-a and a secondary cell 235-b. The primary cell 235-a and secondary cell 235-b may be cells of a single base station, or cells of multiple base stations. The UE 115-b is in communication with the primary cell 235-a through first component carrier 205, which includes uplink component carrier 215 and downlink component carrier 220. The UE 115-b is also in communication with secondary cell 235-b through second component carrier 210, which includes uplink component carrier 225 and downlink component carrier 230.

Component carriers may be distinct from other portions of system bandwidth. For instance, a component carrier may be relatively narrow-bandwidth carrier susceptible of being utilized independently or in combination with other component carriers. A component carrier may appear to some UEs 115 as, and the component carrier may provide the same capabilities as, for instance, a carrier based on release 8 or release 9 of the LTE standard. But multiple component carriers may be aggregated and/or utilized concurrently to provide some UEs 115 with greater bandwidth and, e.g., higher data rates. Thus, component carriers may be backwards compatible with certain legacy UEs 115 (e.g., UEs 115 implementing LTE release 8 or release 9); and other UEs 115 (e.g., UEs 115 implementing post-release 8/9 LTE versions), may be configured with multiple component carriers in a multi-carrier mode.

While FIG. 2 illustrates two component carriers, it will be readily understood that more than two component carriers may be present between a UE 115-b and two or more cells. When operating in a multi-carrier mode, UE 115-b may establish an initial connection with the primary cell 235-a using the first component carrier 205. The primary cell 235-a may then instruct the UE 115-b to establish a connection with the secondary cell 235-b using the second component carrier. While multiple component carriers 205, 210, are present, the UE 115-b remains in a Radio Resource Control (RRC) connected state. According to various implementations, the RRC connection is handled by one cell, the primary cell 235-a, served by the first component carrier 205. The UE 115-b may receive information, such a non-access stratum (NAS) information on the downlink component carrier 220. Similarly, in idle mode the UE 115-b may listen to system information on the downlink component carrier 220. Different secondary cells and associated component carriers may be added and removed as required, while the primary cell 235-a may be changed by a handover procedure.

In the event of a disruption in the first component carrier 205, a UE 115-b may enter into a service evaluation and acquisition procedure. Such a disruption may be a radio link failure (RLF) in which the UE 115-b is no longer able to adequately receive signals using the first component carrier 205. The service evaluation and acquisition procedure involves the UE 115-a initially accessing an acquisition database, which may include a number of frequencies and cell IDs of other cells with which the UE 115-b may attempt to establish communications. The acquisition database may be populated, for example, through reading of system information blocks (SIBs) of cells other than the primary cell 235-a. If the UE 115-b finds service on one of the cells of the acquisition database, the UE may camp on this cell and transmit an RRC reestablishment request. If the UE 115-b is not able to find service using any of the cells of the acquisition database, or if the acquisition database is empty, the UE 115-b may attempt cell acquisition on all supported bands. This process may be relatively time consuming, and potentially result in a service disruption to a user of UE 115-b.

Furthermore, when adding secondary cell 235-b, the UE may not read the SIB of this cell, and therefore this cell may not be included in the acquisition database of the UE 115-b. Thus, even though the UE 115-b had established second component carrier 210 with secondary cell 235-b, in the event of RLF with the primary cell 235-a, it may take a relatively long period for the UE 115-b to reestablish communications using the secondary cell 235-b. Various aspects of the present disclosure provide more efficient reestablishment of communications by, in certain situations, adding a frequency and cell ID of the secondary cell 235-b to the acquisition database even though the UE 115-b has not read the SIB of the secondary cell 235-b. In some examples, the UE may prioritize the secondary cell 235-b ahead of one or more other cells in a connection reestablishment procedure when it is determined that a communication disruption has occurred with primary cell 235-a. In many situations, both the primary cell 235-a and secondary cell 235-b are operated by the same network operator, although this is not required. According to some examples, the UE 115-b may determine that the secondary cell 235-b is operated by the same operator as the primary cell 235-a prior to adding the secondary cell 235-b to the acquisition database. As will be recognized, in some instances connections with operators other than a home network operator of the UE 115-*b* may result in charges being incurred by a user of the UE 115-*b*. Thus, is some implementations it may be desirable to confirm that the secondary cell 235-*b* is operated by the home network operator of the UE 115-*b*. In some examples, the UE 115-*b* may determine that the secondary cell 235-*b* is operated by the same operator as the primary cell 235-*a*, or that the secondary cell 235-*b* is operated by a home network operator. In other examples, the UE 115-*b* may assume that the secondary cell 235-*b* is operated by the same operator as the primary cell 235-*a* based on the secondary cell 235-*b* being added in the multiple carrier operation.

As noted above, in some implementations more than two cells may be used in a multi-carrier mode, and in such implementations each of the secondary cells may be added to the acquisition database and therefore prioritized ahead other cells in a connection reestablishment procedure. In some examples, when a connection with secondary cell 235-*b* is released, UE 115-*b* may remove the frequency and cell ID of the released secondary cell 235-*b* from the acquisition database. In other examples, cells in the acquisition database may be prioritized according to a signal strength associated with each cell. In still further examples, the acquisition database may include two separate acquisition databases, one including cells that are added through the reading of SIB from the cell according to traditional service evaluation and acquisition procedures, and another that includes cells that are added based on the cells being used in the multi-carrier mode by the UE 115-*b*. The prioritization of cells in an acquisition database according to various examples will be described in further detail below.

Figure 3:
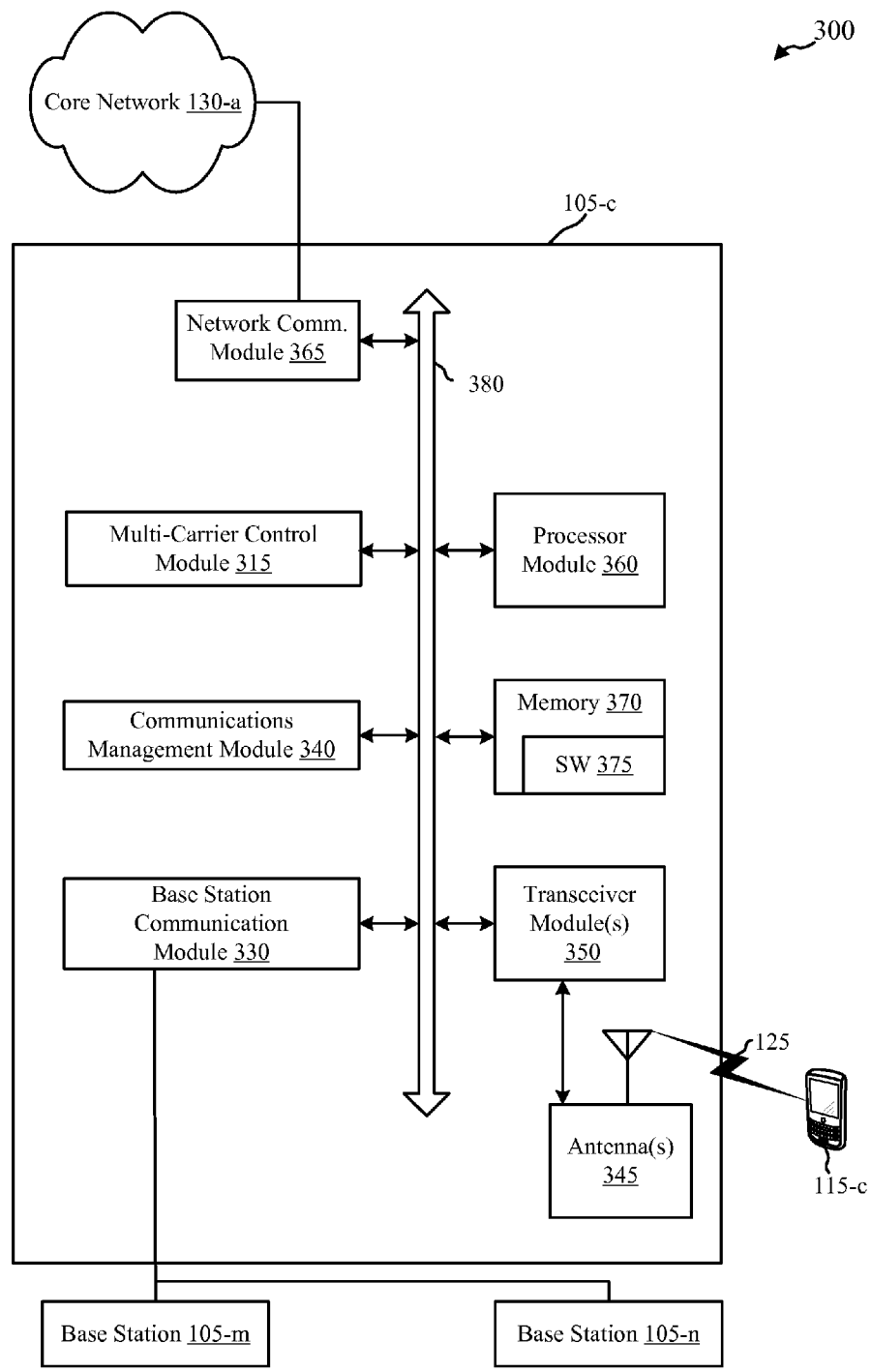
FIG. 3 shows a block diagram of an example of a base station, in accordance with aspects of the present disclosure.

Thus, in order to provide relatively fast an deficient recovery from primary cell signal disruptions, various aspects of the present disclosure provide for prioritization of one or more secondary cells in communication reestablishment following a disruption in communication with a primary cell. FIG. 3 shows a block diagram of a communications system 300 that may provide for prioritization of secondary cells in communication reestablishment such as described above. This system 300 may be an example of aspects of the system 100 depicted in FIG. 1 or system 200 of FIG. 1. System 300 may include a base station 105-*c*, which may be an example of a base station of FIG. 1 or 2. The base station 105-*c* may include antenna(s) 345, a transceiver module 350, memory 370, and a processor module 360, which each may be in communication, directly or indirectly, with each other (e.g., over one or more buses 380). The transceiver module 350 may be configured to communicate bi-directionally, via the antenna(s) 345, with UE 115-*c* (and/or other UEs). The transceiver module 350 (and/or other components of the base station 105-*c*) may also be configured to communicate bi-directionally with one or more networks. In some cases, the base station 105-*c* may communicate with the core network 130-*a* through network communications module 365. Base station 105-*c* may be an example of an eNodeB base station, a Home eNodeB base station, a NodeB base station, and/or a Home NodeB base station.

Base station 105-*c* may also communicate with other base stations 105, such as base station 105-*m* and base station 105-*n*. In some cases, base station 105-*c* may communicate with other base stations such as 105-*m* and/or 105-*n* utilizing base station communication module 330. In some examples, base station communication module 330 may provide an X2 interface within an LTE wireless communication technology to provide communication between some of the base stations 105. In some examples, base station 105-*c* may communicate with other base stations through core network 130-*a*.

The memory 370 may include random access memory (RAM) and read-only memory (ROM). The memory 370 may also store computer-readable, computer-executable software code 375 containing instructions that are configured to, when executed, cause the processor module 360 to perform various functions described herein (e.g., system evaluation and acquisition, connection reestablishment, prioritization of secondary cells, etc.). Alternatively, the software code 375 may not be directly executable by the processor module 360 but be configured to cause the processor, e.g., when compiled and executed, to perform functions described herein.

The processor module 360 may include an intelligent hardware device, e.g., a central processing unit (CPU), a microcontroller, an application-specific integrated circuit (ASIC), etc. The transceiver module(s) 350 may include a modem configured to modulate the packets and provide the modulated packets to the antenna(s) 345 for transmission, and to demodulate packets received from the antenna(s) 345. While some examples of the base station 105-*c* may include a single antenna 345, the base station 105-*c* may include multiple antennas 345 for multiple links.

According to the architecture of FIG. 3, the base station 105-*c* may further include a communications management module 340. The communications management module 340 may manage communications with other base stations 105. By way of example, the communications management module 340 may be a component of the base station 105-*c* in communication with some or all of the other components of the base station 105-*c* via a bus 380. Alternatively, functionality of the communications management module 340 may be implemented as a component of the transceiver module 350, as a computer program product, and/or as one or more controller elements of the processor module 360.

In some examples, base station 105-*c* includes a multi-carrier control module 315 that determines that a multi-carrier mode is to be initiated for UE 115-*c*. For example, base station 105-*c* and UE 115-*c* may initiate communications, with base station 105-*c* acting as a primary cell for communications. At some point, traffic patterns may change such that additional bandwidth is needed in communications with UE 115-*c*, and the multi-carrier control module 315 may instruct the UE 115-*c* to initiate a connection with a secondary cell using a second component carrier. The secondary cell connection may be a secondary cell connection with the base station 105-*c* using the second component carrier, or a secondary cell connection with another base station (not shown) using the second component carrier. Such instructions may provide the UE 115-*c* with a frequency and cell ID of the secondary cell, which the UE 115-*c* may use to initiate communications with the secondary cell. According to some examples, the frequency and cell ID of the secondary cell may be added to an acquisition database for use in reestablishing communications with the UE 115-*c* following a disruption in service with base station 105-*c* on the primary cell.

Figure 4:
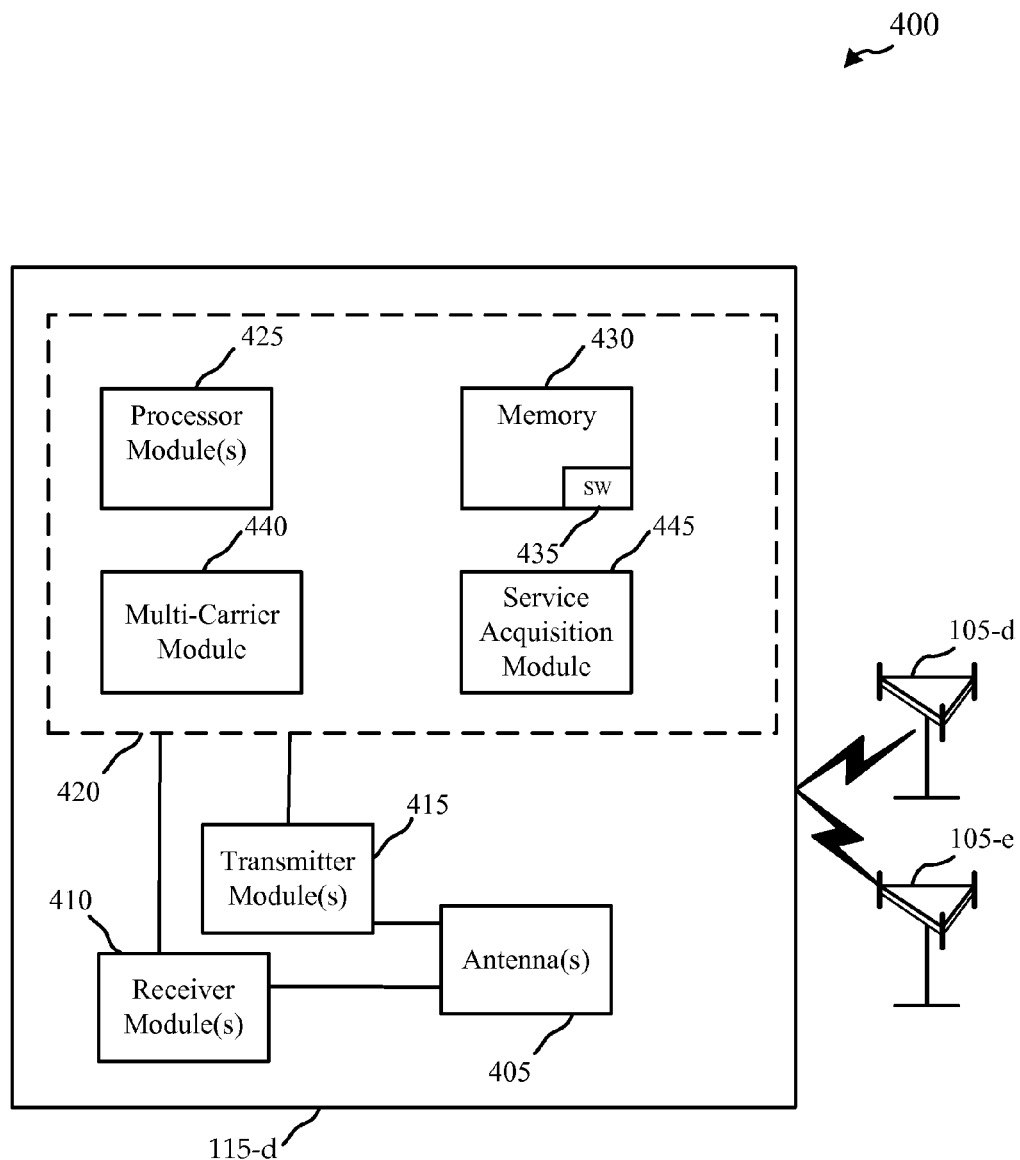
FIG. 4 shows a block diagram of an example of a user equipment, in accordance with aspects of the present disclosure.

According to some examples, a UE may use information related to one or more secondary cells to enhance recovery from a disruption in communication with a primary cell. With reference now to FIG. 4, an example wireless communication system 400 that performs a multiple carrier operation and related connection reestablishment procedures following a disruption in communications with a primary cell. System 400 includes a UE 115-*d* that may communicate with base station 105-*d* to receive access to one or more wireless networks, and may be an example of aspects of the system 100 of FIG. 1, system 200 of FIG. 2, or system 300 of FIG. 3. UE 115-*d* may be an example of a user equipment 115 of FIGS. 1-3. UE 115-*d*, includes one or more antenna(s) 405 communicatively coupled to receiver module(s) 410 and transmitter module(s) 415, which are in turn communicatively coupled to a control module 420. Control module 420 includes one or more processor module(s) 425, a memory 430 that may include software 435, a multi-carrier module 440, and a service acquisition module 445. The software 435 may be for execution by processor module 425, multi-carrier module 440, and/or service acquisition module 445.

The processor module(s) 425 may include an intelligent hardware device, e.g., a central processing unit (CPU), a microcontroller, an application specific integrated circuit (ASIC), etc. The memory 430 may include random access memory (RAM) and read-only memory (ROM). The memory 430 may store computer-readable, computer-executable software code 435 containing instructions that are configured to, when executed (or when compiled and executed), cause the processor module 425, multi-carrier module 440, and/or service acquisition module 445 to perform various functions described herein. The multi-carrier module 440, and/or service acquisition module 445 may be implemented as a part of the processor module(s) 425, or may be implemented using one or more separate CPUs or ASICs, for example. The transmitter module(s) 415 may transmit to base station 105-*d* (and/or other base stations) to establish communications with one or more wireless communications networks (e.g., E-UTRAN, UTRAN, etc.), as described above.

The multi-carrier module 440 may be configured to receive multi-carrier instructions from base station 105-*d* and initiate communications with a secondary cell at the base station 105-*d* or base station 105-*e*. The multi-carrier module 440 may, for example, receive instructions from base station 105-*d* to initiate a multi-carrier mode by adding a second component carrier and communicating with a secondary cell at base station 105-*e*. Alternatively or in addition, the multi-carrier module 440 may, for example, receive instructions from base station 105-*d* to initiate a multi-carrier mode by adding a second component carrier and communicating with a secondary cell at base station 105-*d*. The service acquisition module 445 may perform service acquisition procedures associated with the UE 115-*d*, such as initial service acquisition and reestablishment of disrupted communications. As part of communications reestablishment procedures, service acquisition module 445 may add information to an acquisition database, as will be described in further detail below, to assist in finding service following a disruption in communications, such as a RLF. The receiver module(s) 410 may receive downlink transmissions from base station 105-*d* (and/or other base stations), such as described above. Downlink transmissions are received and processed at the user equipment 115-*d*. The components of UE 115-*d* may, individually or collectively, be implemented with one or more Application Specific Integrated Circuits (ASICs) adapted to perform some or all of the applicable functions in hardware. Each of the noted modules may be a means for performing one or more functions related to operation of the UE 115-*d*.

Figure 5A:
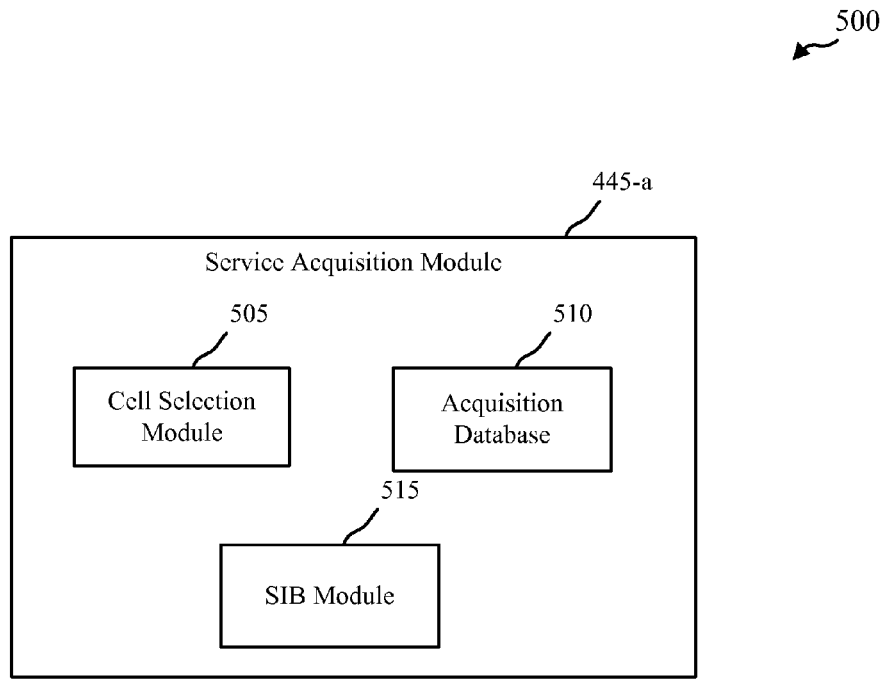
FIG. 5A shows a block diagram of an example of a service acquisition module, in accordance with aspects of the present disclosure.

FIG. 5A is a block diagram 500 of an example of a service acquisition module 445-*a*. Service acquisition module 445-*a* may be an example of service acquisition module 445 of FIG. 4. In this example, service acquisition module 445-*a* includes a cell selection module 505, an acquisition database 510 and a SIB module 515. Cell selection module 505 may, according to various examples, attempt to acquire signals from cells and establish wireless communications with identified cells. In some examples, the cell selection module 505 may receive one or more signals from a base station and SIB module 515 may read a system information block (SIB) from the signals. Based on an evaluation of the SIB, the cell selection module 505 may add the cell to the acquisition database 510. Information added to the cell acquisition database 510 may include a frequency and cell ID of the identified cell.

In the event of a disruption in communications with the primary cell (e.g., base station 105-*d* of FIG. 4), the cell selection module 505 may first attempt to reestablish communications with the primary cell. If it is determined that communications cannot be reestablished with the primary cell, the cell selection module may access the acquisition database 510 and retrieve the frequency and cell ID of another cell and attempt to reestablish communications using that cell. In the event that communications are not able to be established with cells listed in the acquisition database 510, cell selection module 505 may attempt acquisition of other cells on all supported frequency bands of the UE, which may ultimately result in the UE establishing a connection with a cell that had been a secondary cell used by the UE in the multi-carrier mode.

According to various examples, when a multi-carrier connection with a secondary cell is established, the secondary cell may be added to the acquisition database 510. In some cases, such a secondary cell may be added to the acquisition database 510 even though the UE has not received a system information block associated with the secondary cell. In such a manner, then the cell selection module 505 accesses the acquisition database 510, the frequency and cell ID of the secondary cell may be retrieved and communications established with the secondary cell. In some examples, this will result in the UE acquiring and establishing communications following a disruption with the primary cell (e.g., a RLF) significantly more quickly than may be the case if the secondary cell is not included in the acquisition database 510. In some examples, the acquisition database 510 may include a prioritization associated with each cell included in the database. Such prioritization may be based on, for example, a received signal strength of the cell, or on some other metric that may indicate a particular cell has a relatively high likelihood of successfully reestablishing communications. In some examples, the secondary cell may be prioritized ahead of any cell other than a most recent primary cell. In some cases, cell selection module may add a secondary cell to the acquisition database 510 when the UE established the secondary component carrier with the secondary cell, and then remove the secondary cell from the acquisition database 510 when the UE releases the secondary component carrier.

Figure 5B:
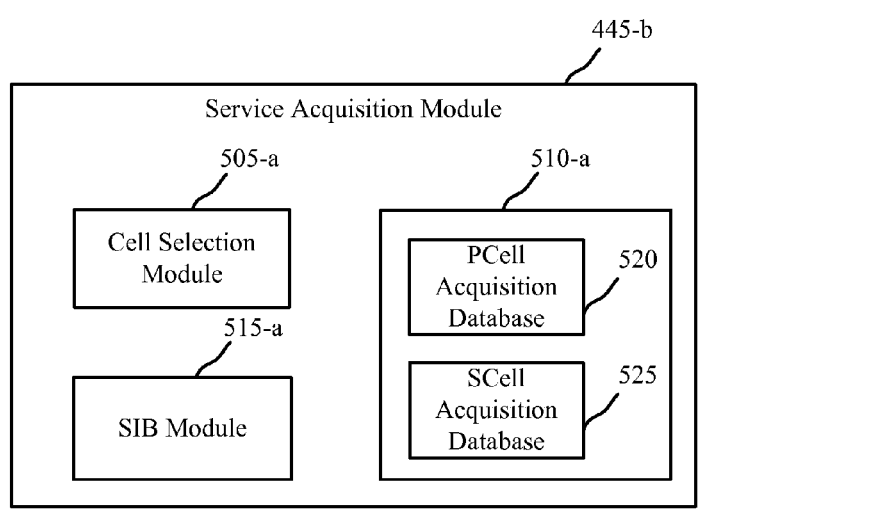
FIG. 5B shows a block diagram of another example of a service acquisition module, in accordance with aspects of the present disclosure.

In some examples, the acquisition database 510 may include multiple lists of cells that may be used in connection establishments. FIG. 5B is a block diagram 550 of a service acquisition module 445-*b* that includes an acquisition database 510-*a* including a primary cell acquisition database 520 and a secondary cell acquisition database 525. Service acquisition module 445-*b* may be an example of service acquisition module 445 of FIG. 4. In some examples, cell selection module 505-*a* and SIB module 515-*a* may operate as discussed above and first attempt to reestablish communications using cells listed in the primary cell acquisition database 520, and then turn to cells listed in the secondary cell acquisition database 525. In other examples, cells within each database may be prioritized based on cells that have higher likelihood of successful connection reestablishment. Such prioritization may be based on, for example, a received signal strength of the cell, or on some other metric that may indicate a particular cell has a relatively high likelihood of successfully reestablishing communications.

In some examples, the cell selection module 505-*a* may first attempt a connection reestablishment using a cell of the primary cell acquisition module 520, then attempt a connection reestablishment using one or more cells of the secondary cell acquisition module 525, and then attempt the connection reestablishment using one or more other cells of the primary cell acquisition module 520. In some cases, cell selection module may add one or more secondary cells to the secondary cell acquisition database 525 when the UE establishes the secondary component carrier(s) with the secondary cell(s), and then remove secondary cell(s) from the secondary cell acquisition database 525 when the UE releases each respective secondary component carrier.

Figure 6:
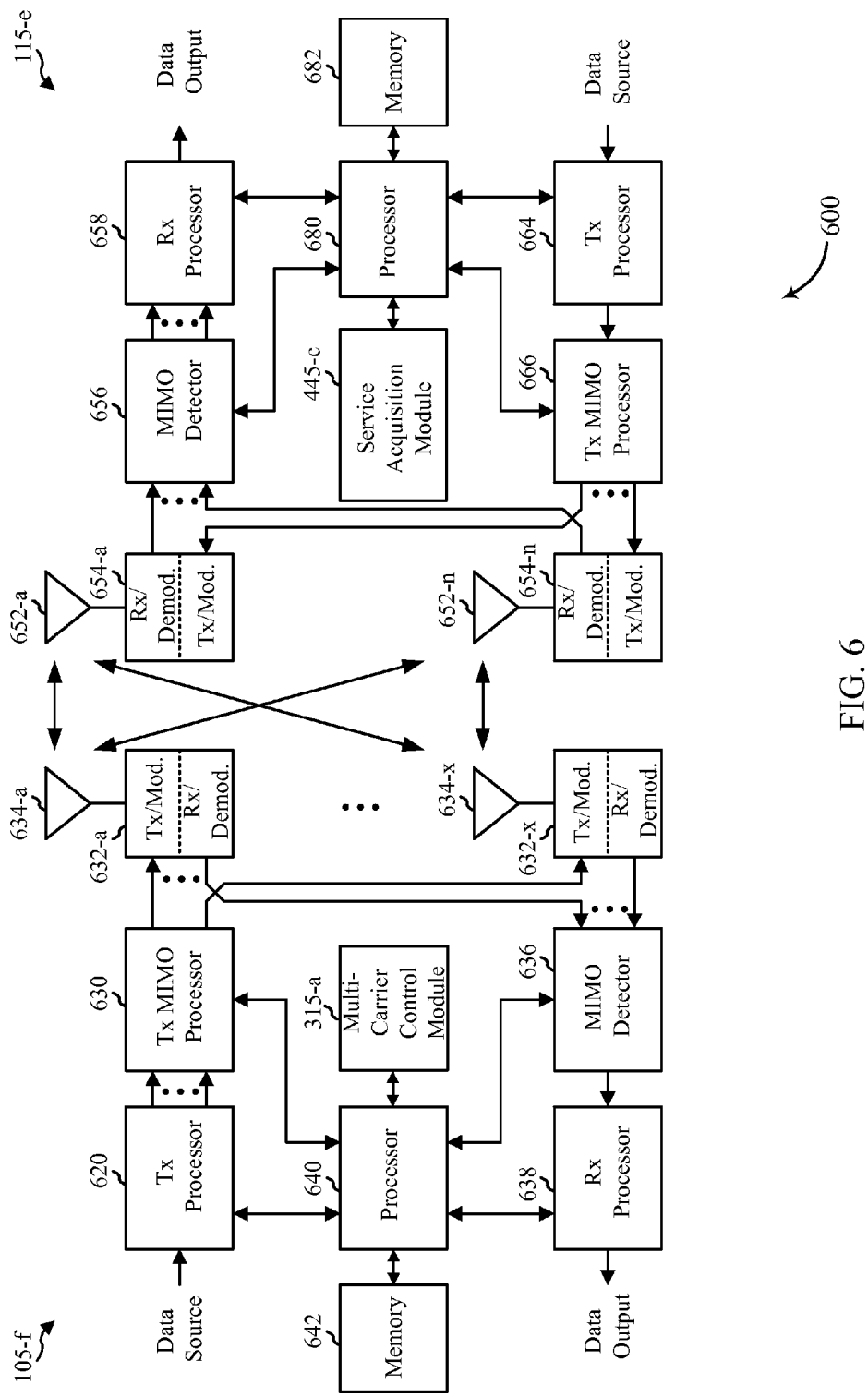
FIG. 6 shows a block diagram of an example of a user equipment and base station, in accordance with aspects of the present disclosure.

FIG. 6 is a block diagram of a system 600 including a base station 105-*f* and a mobile device 115-*e*. This system 600 may be an example of the system 100 of FIG. 1, system 200 of FIG. 3, system 300 of FIG. 3, or system 400 of FIG. 4. The base station 105-*f* may be equipped with antennas 634-*a* through 634-*x*, and the mobile device 115-*e* may be equipped with antennas 652-*a* through 652-*n*. At the base station 105-*f*, a transmit processor 620 may receive data from a data source.

The transmit processor 620 may process the data. The transmit processor 620 may also generate reference symbols, and a cell-specific reference signal. A transmit (TX) MIMO processor 630 may perform spatial processing (e.g., precoding) on data symbols, control symbols, and/or reference symbols, if applicable, and may provide output symbol streams to the transmit modulators 632-*a* through 632-*x*. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink (DL) signal. In one example, DL signals from modulators 632-*a* through 632-*x* may be transmitted via the antennas 634-*a* through 634-*x*, respectively.

At the mobile device 115-*e*, the mobile device antennas 652-*a* through 652-*n* may receive the DL signals according to the particular TDD Uplink/Downlink configuration from the base station 105-*f* and may provide the received signals to the demodulators 654-*a* through 654-*n*, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654-*a* through 654-*n*, perform MIMO detection on the received symbols if applicable, and provide detected symbols. A receive processor 658 may process (e.g., demodulate, deinterleave, and decode) the detected symbols, providing decoded data for the mobile device 115-*e* to a data output, and provide decoded control information to a processor 680, or memory 682. The processor 680 may be coupled with a service acquisition module 445-*c* that may prioritize cells for connection reestablishment following a disruption in a wireless connection with the UE 115-*e*, such as described above.

On the uplink (UL), at the mobile device 115-*e*, a transmit processor 664 may receive and process data from a data source. The transmit processor 664 may also generate reference symbols for a reference signal. The symbols from the transmit processor 664 may be precoded by a transmit MIMO processor 666 if applicable, further processed by the demodulators 654-*a* through 654-*n* (e.g., for SC-FDMA, etc.), and be transmitted to the base station 105-*f* in accordance with the transmission parameters received from the base station 105-*f*. At the base station 105-*f*, the UL signals from the mobile device 115-*e* may be received by the antennas 634, processed by the demodulators 632, detected by a MIMO detector 636 if applicable, and further processed by a receive processor 638. The receive processor 638 may provide decoded data to a data output and to the processor 640. A memory 642 may be coupled with the processor 640.

A multi-carrier control module 315-*a* may, in some examples, direct device 115-*e* to add or release one or more secondary component carriers with one or more secondary cells, such as described above. Similarly as discussed above, system 600 may support operation on multiple component carriers, each of which include waveform signals of different frequencies that are transmitted between device 115-*e* and base station 105-*f*. Multiple component carriers may carry uplink and downlink transmissions between mobile device 115-*e* and base station 105-*f*. The components of the mobile device 115-*e* may, individually or collectively, be implemented with one or more Application Specific Integrated Circuits (ASICs) adapted to perform some or all of the applicable functions in hardware. Each of the noted modules may be a means for performing one or more functions related to operation of the system 600. Similarly, the components of the base station 105-*f* may, individually or collectively, be implemented with one or more Application Specific Integrated Circuits (ASICs) adapted to perform some or all of the applicable functions in hardware. Each of the noted components may be a means for performing one or more functions related to operation of the system 600.

Figure 7:
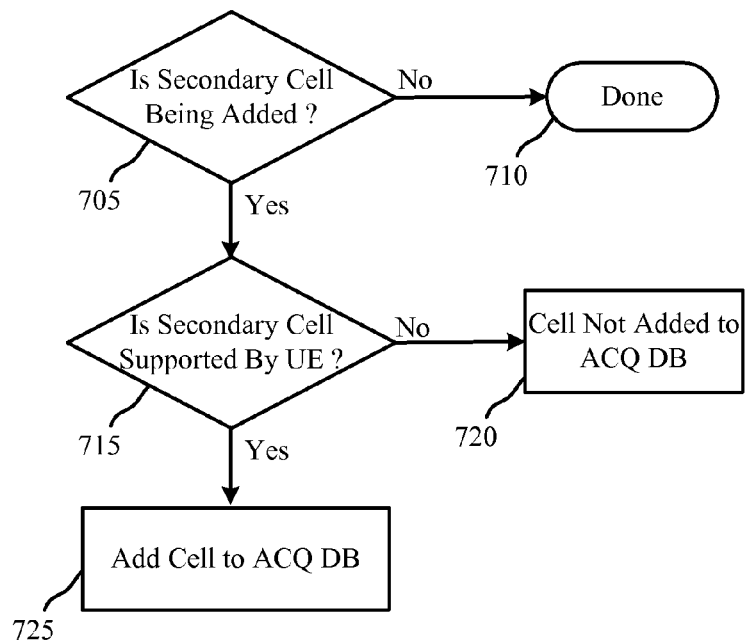
FIG. 7 is a flowchart of a method for addition of cells to an acquisition database, in accordance with aspects of the present disclosure.

FIG. 7 illustrates a method 700 that may be carried out by one or more components of wireless communications system according to various examples. The method 700 may, for example, be performed by a UE of FIG. 1-4, or 6-7, or using any combination of the devices described for these figures. Initially, at block 705, it is determined whether a secondary cell is being added at the UE. If a secondary cell is not being added, the procedure is complete, at indicated at block 710. At block 715, it is determined whether the secondary cell is supported by the UE. Such a secondary cell may be supported if the UE is able to communicate according to a communications format used by the cell, or if the UE is part of a closed cell group (CSG) for the cell, for example. If the secondary cell is not supported by the UE, the cell is not added to the acquisition database, as indicated at block 720. If the secondary cell is supported by the UE, the secondary cell is added to the acquisition database, as indicated at block 725. Thus, in the event of a disruption in communications with the primary cell, the secondary cell may be included in the acquisition database which may increase the speed at which communications may be reestablished following a RLF, for example.

Figure 8:
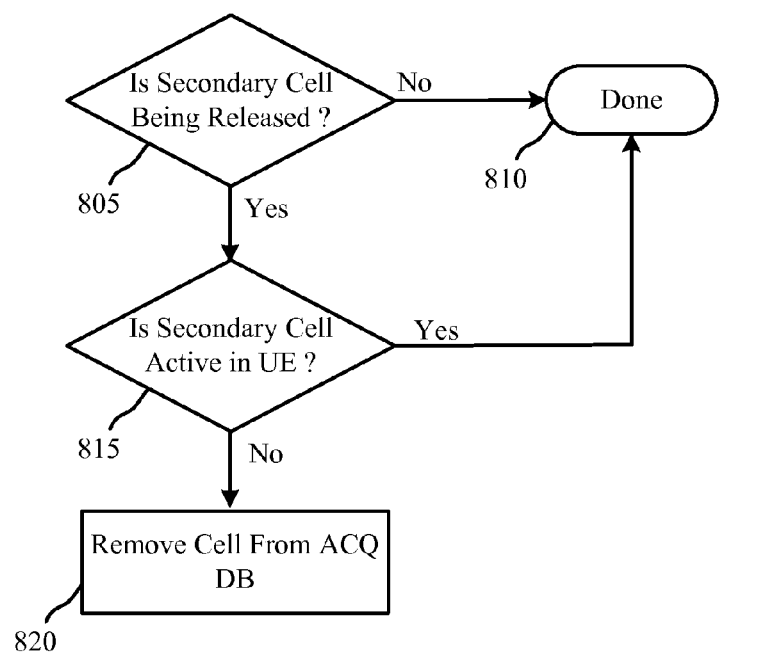
FIG. 8 is a flowchart of a method for removal of cells from an acquisition database, in accordance with aspects of the present disclosure.

FIG. 8 illustrates a method 800 that may be carried out by one or more components of wireless communications system according to various examples. The method 800 may, for example, be performed by a UE of FIGS. 1-4, or 6-7, or using any combination of the devices described for these figures. Initially, at block 805, it is determined whether a secondary cell is being released by the UE. Such a secondary cell may be released when, for example, the UE is instructed by the primary cell to release one or more secondary cells due to a change in traffic conditions. If a secondary cell is not being released, the procedure is complete, at indicated at block 810. At block 815, it is determined whether the secondary cell is active in the UE. Such a secondary cell may be active in the UE if the UE is using the secondary cell for active communications. For example, the UE may have been instructed to reinitiate a secondary component carrier with the secondary cell, and thus the secondary cell may continue to be active in the UE. If the secondary cell is active in the UE, the procedure is complete, as indicated at block 810. If the secondary cell is not active in the UE, the cell is removed from the acquisition database, as indicated at block 820. Thus, secondary cells may be removed from the acquisition database, which may reduce the amount of stale data in the database.

Figure 9:
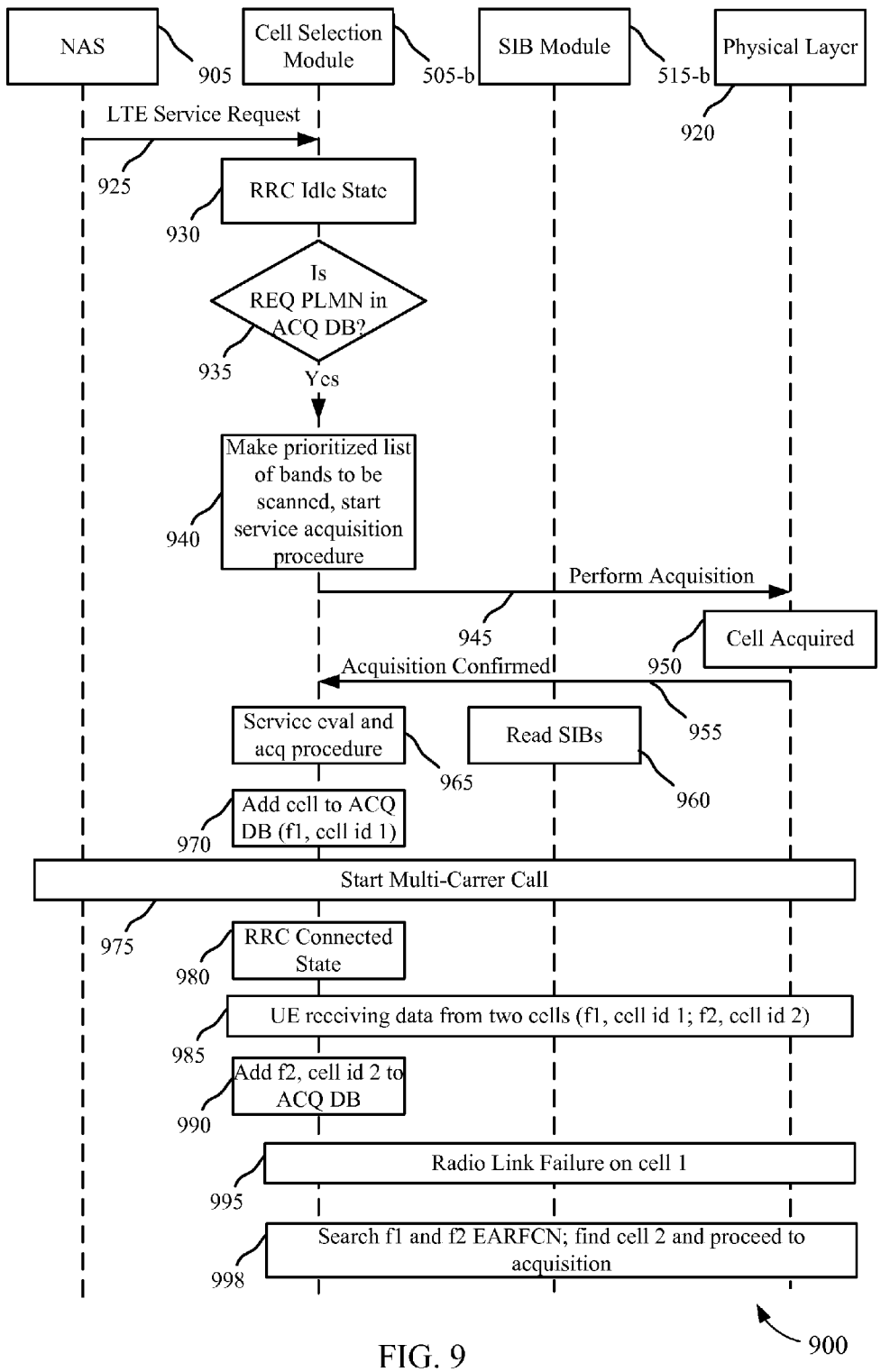
FIG. 9 is a swim diagram showing cell acquisition and radio link failure recovery for a UE operating in a multi-carrier mode, in accordance with aspects of the present disclosure.

FIG. 9 illustrates a diagram 900 showing operations of components of wireless communications system according to various examples. The functions of diagram 900 may, for example, be performed by a system of FIG. 1-4, or 6-7, or using any combination of the devices described for these figures. In this example, a NAS 905 initiates an LTE service request 925 which is received as a cell selection module 505-*b*. In this diagram, the UE is initially in an RRC idle state 930, and the cell selection module 505-*b* determines that the LTE service request indicates a requested public land mobile network (PLNM) that is in the acquisition database. If the requested PLMN is in the acquisition database, the cell selection module 505-*b* makes a prioritized list of bands to be scanned and starts the service acquisition procedure, as indicated at 940. The cell selection module 505-*b* then sends a perform acquisition command to the physical layer 920 of the UE. At 950, the physical layer acquires the cell, and sends an acquisition confirmed 955 message to the cell selection module 505-*b*. The cell selection module 505-*b* then performs service evaluation and acquisition procedures 965, and the SIB module 515-*b* reads SIBs of the acquired cell at 960. At 970, the cell acquisition module 505-*b* adds the cell to the acquisition database, including a frequency (f1) and cell identification (cell ID 1).

The UE is thus in communication with a primary cell. At 975, the UE starts a multi-carrier call. Such a multi-carrier call includes initiating a secondary component carrier to communicate with a secondary cell. The UE, in such a situation, is in an RRC connected state 980 with primary cell. Following the start of the multi-carrier call, the UE is receiving data from two cells, as indicated at 985. Namely, the UE is receiving data from primary cell (f1, cell ID 1) and a secondary cell (f2, cell ID 2). The cell selection module 505-*b* then adds information associated with the secondary cell (f2, cell ID 2) to the acquisition database, as indicated at 990. A radio link failure then may occur on the primary cell, as indicated at 995. Because information related to the secondary cell is in the acquisition database, the UE searches the frequencies for the primary and secondary cells (f1, f2) for the cell ids (e.g., E-UTRA Absolute Radio Frequency Channel Number (EARFCN)) of the primary and secondary cells, finds the secondary cell, and proceeds to the acquisition procedure using the secondary cell. Thus, the service evaluation and acquisition procedure following such an RLF may occur more quickly because the secondary cell is included in the acquisition database.

Figure 10:
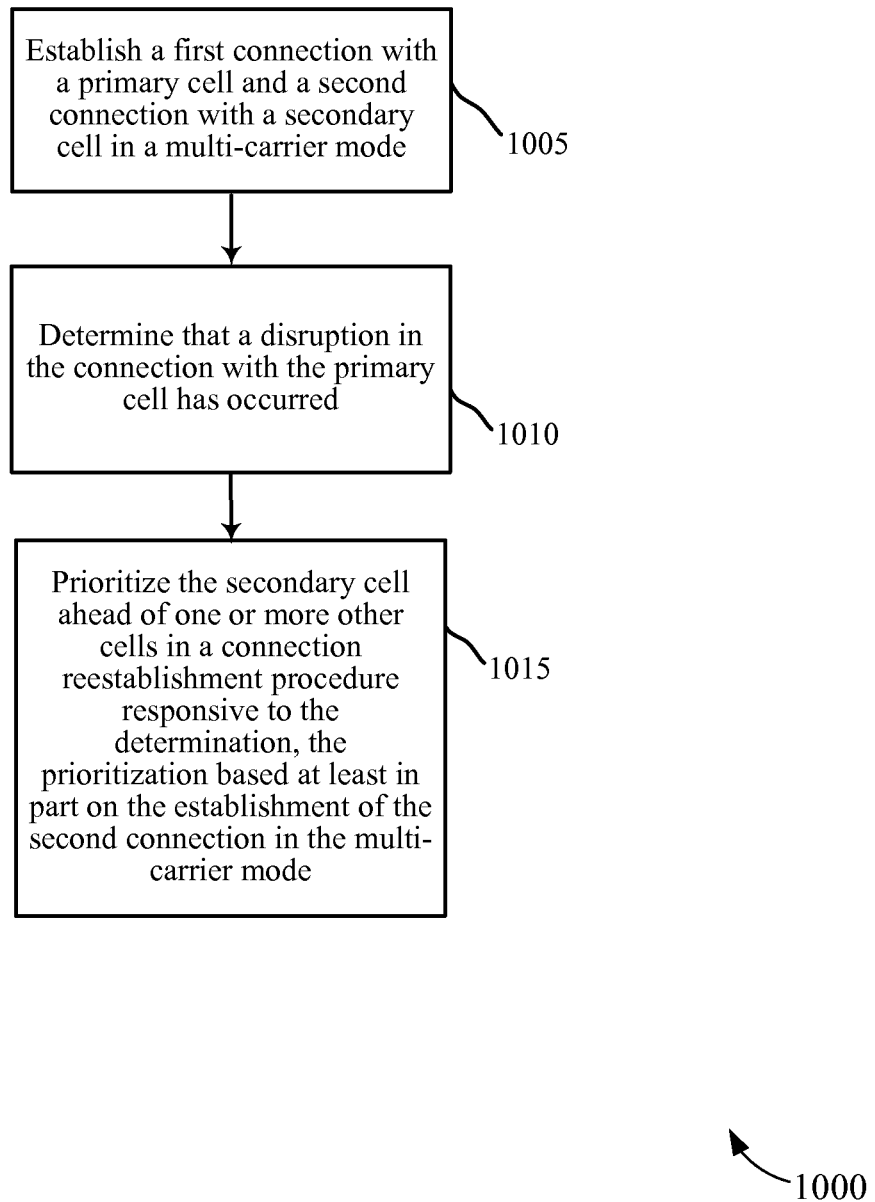
FIG. 10 is a flowchart of a method for connection reestablishment following a disruption for a UE operating in a multi-carrier mode, in accordance with aspects of the present disclosure.

FIG. 10 illustrates another method 1000 that may be carried out by one or more components of wireless communications system according to various examples. The method 1000 may, for example, be performed by a UE of FIG. 1-4, 6-7, or 9, or using any combination of the devices described for these figures. Initially, at block 1005, the UE establishes a first connection with a primary cell and a second connection with a secondary cell in a multi-carrier mode. At block 1010, it is determined that a disruption in the connection with the primary cell has occurred. Such a disruption may be, for example, an indication of RLF on the primary cell. At block 1015, the UE prioritizes the secondary cell ahead of one or more other cells in a connection reestablishment procedure responsive to the determination, the prioritization based at least in part on the establishment of the second connection in the multi-carrier mode.

In some examples, cells in the acquisition database may be prioritized according to a signal strength associated with each cell, such that reestablishment may be attempted with cells having higher signal strength before attempts with cells having lower signal strength. As discussed above, the second connection with the secondary cell may be established through a multi-carrier command received at the UE. In some examples, the UE may determine, prior to the prioritizing, that the secondary cell is operated by the same operator as the primary cell, wherein the determination is a precondition of the prioritizing. In other examples, the UE may assume that the secondary cell is operated by the same operator as the primary cell.

Figure 11:
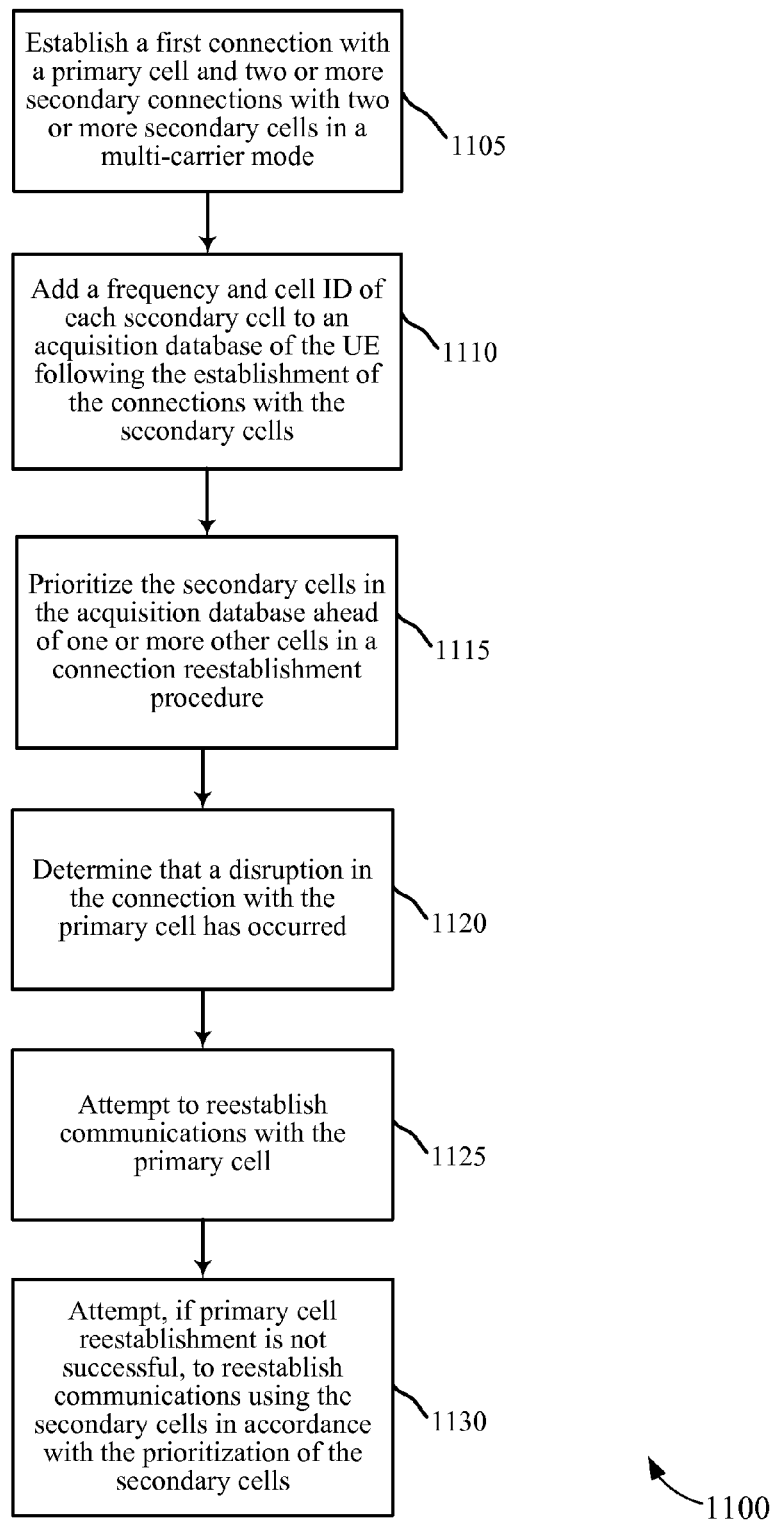
FIG. 11 is a flowchart of another method for connection reestablishment following a disruption for a UE operating in a multi-carrier mode, in accordance with aspects of the present disclosure.

FIG. 11 illustrates another method 1100 that may be carried out by one or more components of wireless communications system according to various examples. The method 1100 may, for example, be performed by a UE of FIG. 1-4, 6-7, or 9, or using any combination of the devices described for these figures. Initially, at block 1105, the UE establishes a first connection with a primary cell and two or more secondary cell connections with two or more secondary cells in a multi-carrier mode. At block 1110, the UE adds a frequency and cell ID of each secondary cell to an acquisition database of the UE, following the establishment of the connections with the secondary cells. At block 1115, the UE prioritizes the secondary cells in the acquisition database ahead of one or more other cells in a connection reestablishment procedure. In some examples, the secondary cells are prioritized after the primary cell, but ahead of other cells that may be included in the acquisition database. In some examples, the secondary cells may be prioritized according to signal strength of the cells, or by some other metric that may indicate higher likelihood of establishing a connection with a cell. At block 1120, it is determined that a disruption in the connection with the primary cell has occurred. Such a disruption may be, for example, an indication of RLF on the primary cell. At block 1125, the UE attempts to reestablish communications with the primary cell. At block 1130, if the primary cell reestablishment is not successful, the UE attempts to reestablish communications using the secondary cells in accordance with the prioritization of the secondary cells.

Figure 12:
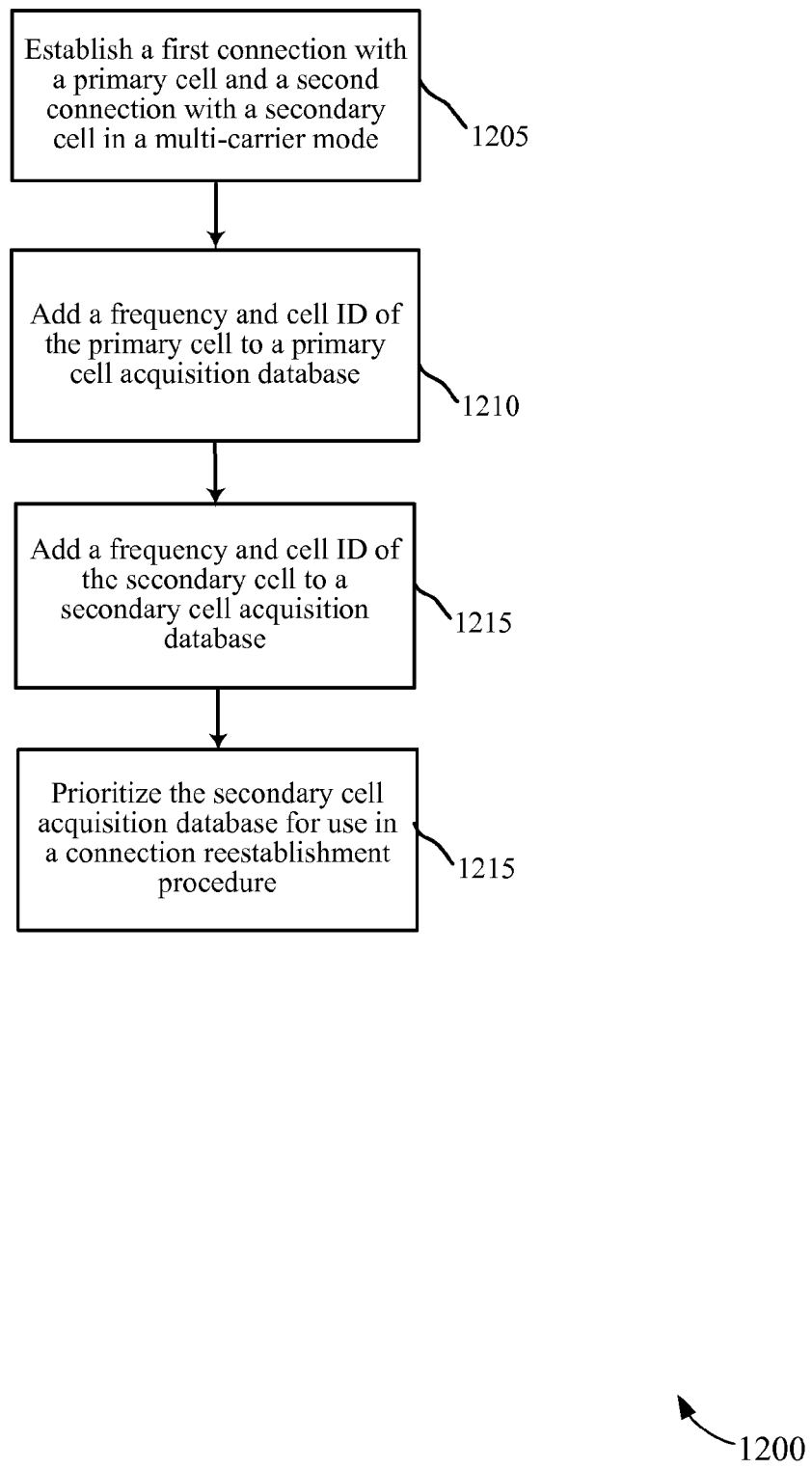
FIG. 12 is a flowchart of another method for connection reestablishment following a disruption for a UE operating in a multi-carrier mode, in accordance with aspects of the present disclosure.

FIG. 12 illustrates another method 1200 that may be carried out by one or more components of wireless communications system according to various examples. The method 1200 may, for example, be performed by a UE of FIG. 1-4, 6-7, or 9, or using any combination of the devices described for these figures. Initially, at block 1205, the UE establishes a first connection with a primary cell and a second connection with a secondary cell in a multi-carrier mode. At block 1210, the UE adds a frequency and cell ID of the primary cell to a primary cell acquisition database. At block 1215, the UE adds a frequency and cell ID of the secondary cell to a secondary cell acquisition database. In some examples, multiple secondary cells may be added to the secondary cell acquisition database, based on the present of multiple secondary cells that may be used in the multi-carrier mode. Additionally or alternatively, the UE may remove the frequency and cell ID of a secondary cell from the acquisition database following the release of the secondary component carrier in the multi-carrier mode. Finally, at block 1215, the UE prioritizes the secondary cells in the secondary cell acquisition database for use in a connection reestablishment procedure. Similarly as discussed above, the secondary cells may be prioritized according to signal strength, or by some other metric that may indicate higher likelihood of establishing a connection with a cell. In some examples, cells in the primary cell acquisition database are prioritized ahead of cells in the secondary cell database.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication by a user equipment (UE) in a wireless communication system, comprising:
    establishing a first connection with a primary cell and a second connection with a secondary cell in a multi-carrier mode;
    determining that a disruption in the first connection with the primary cell has occurred;
    adding a frequency and cell identity (ID) of the secondary cell to an acquisition database of the UE following the establishment of the second connection with the secondary cell; and
    prioritizing the secondary cell ahead of one or more other cells in a connection reestablishment procedure responsive to the determination, the prioritization based at least in part on the establishment of the second connection in the multi-carrier mode and the addition of the frequency and cell ID of the secondary cell to the acquisition database.

2. The method of claim 1, wherein a system information block (SIB) of the secondary cell is not read by the UE prior to the addition of the frequency and cell ID of the secondary cell to the acquisition database.

3. The method of claim 1, wherein the second connection with the secondary cell is established through a multi-carrier command received at the UE.

4. The method of claim 1, further comprising:
    determining, prior to the prioritizing, that the secondary cell is operated by the same operator as the primary cell, wherein the determining is a precondition of the prioritizing.

5. The method of claim 1, wherein the UE assumes that the secondary cell is operated by the same operator as the primary cell.

6. The method of claim 1, wherein establishing the second connection comprises establishing additional connections with two or more secondary cells in the multi-carrier mode, and wherein prioritizing comprises prioritizing one or more of the secondary cells ahead of one or more other cells in the connection reestablishment procedure.

7. The method of claim 6, further comprising:
adding a frequency and cell ID of each of the two or more secondary cells to the acquisition database of the UE following the establishment of the additional connections with the secondary cells;
releasing one of the additional connections associated with one of the secondary cells; and
removing the frequency and cell ID of the released secondary cell from the acquisition database.

8. The method of claim 1,
wherein prioritizing comprises prioritizing cells in the acquisition database for connection reestablishment attempts.

9. The method of claim 8, wherein the acquisition database comprises a primary cell acquisition database and a secondary cell acquisition database, and wherein cells in the primary cell acquisition database are prioritized ahead of cells in the secondary cell acquisition database.

10. The method of claim 8, wherein the acquisition database comprises a primary cell acquisition database and a secondary cell acquisition database, and wherein cells in the secondary cell acquisition database are prioritized ahead of cells in the primary cell acquisition database.

11. The method of claim 8, wherein cells in the acquisition database are prioritized according to a signal strength associated with each cell.

12. An apparatus for wireless communication by a user equipment (UE) in a wireless communication system, comprising:
means for establishing a first connection with a primary cell and a second connection with a secondary cell in a multi-carrier mode;
means for determining that a disruption in the first connection with the primary cell has occurred;
means for adding a frequency and cell identity (ID) of the secondary cell to an acquisition database of the UE following the establishment of the second connection with the secondary cell; and
means for prioritizing the secondary cell ahead of one or more other cells in a connection reestablishment procedure responsive to the determination, the prioritization based at least in part on the establishment of the second connection in the multi-carrier mode and the addition of the frequency and cell ID of the secondary cell to the acquisition database.

13. The apparatus of claim 12, wherein the means for establishing the second connection comprises means for establishing additional connections with two or more secondary cells in multi-carrier mode, and wherein the means for prioritizing comprises means for prioritizing one or more of the secondary cells ahead of one or more other cells in the connection reestablishment procedure.

14. The apparatus of claim 13, further comprising:
means for adding a frequency and cell ID of each of the two or more secondary cells to the acquisition database of the UE following the establishment of the additional connections with the secondary cells;
means for releasing one of the additional connections associated with one of the secondary cells; and
means for removing the frequency and cell ID of the released secondary cell from the acquisition database.

15. The apparatus of claim 12,
wherein the means for prioritizing comprises means for prioritizing cells in the acquisition database for connection reestablishment attempts.

16. An apparatus for wireless communication in a wireless communication system, comprising:
a processor;
memory in electronic communication with the processor; and
instructions being stored in the memory, the instructions being executable by the processor to:
establish a first connection with a primary cell and a second connection with a secondary cell in a multi-carrier mode;
determine that a disruption in the first connection with the primary cell has occurred;
add a frequency and cell identity (ID) of the secondary cell to an acquisition database of the UE following the establishment of the second connection with the secondary cell; and
prioritize the secondary cell ahead of one or more other cells in a connection reestablishment procedure responsive to the determination, the prioritization based at least in part on the establishment of the second connection in the multi-carrier mode and the addition of the frequency and cell ID of the secondary cell to the acquisition database.

17. The apparatus of claim 16, wherein the instructions to establish the second connection are executable by the processor to establish additional connections with two or more secondary cells in multi-carrier mode, and wherein the instructions to prioritize are executable by the processor to prioritize one or more of the secondary cells ahead of one or more other cells in the connection reestablishment procedure.

18. The apparatus of claim 17, wherein the instructions are further executable by the processor to:
add a frequency and cell ID of each of the two or more secondary cells to the acquisition database of the UE following the establishment of the additional connections with the secondary cells;
release one of the additional connections associated with one of the secondary cells; and
remove the frequency and cell ID of the released secondary cell from the acquisition database.

19. The apparatus of claim 16, wherein the instructions are further executable by the processor to:
prioritize cells in the acquisition database for connection reestablishment attempts.

20. The apparatus of claim 19, wherein the acquisition database comprises a primary cell acquisition database and a secondary cell acquisition database, and wherein cells in the primary cell acquisition database are prioritized ahead of cells in the secondary cell acquisition database.

21. The apparatus of claim 19, wherein the acquisition database comprises a primary cell acquisition database and a secondary cell acquisition database, and wherein cells in the secondary cell acquisition database are prioritized ahead of cells in the primary cell acquisition database.

22. The apparatus of claim 19, wherein cells in the acquisition database are prioritized according to a signal strength associated with each cell.

23. A non-transitory computer-readable medium storing code for wireless communication in a wireless communication system, the code comprising instructions executable by a processor to:
establish a first connection with a primary cell and a second connection with a secondary cell in a multi-carrier mode;
determine that a disruption in the first connection with the primary cell has occurred;

add a frequency and cell identity (ID) of the secondary cell to an acquisition database of the UE following the establishment of the second connection with the secondary cell; and prioritize the secondary cell ahead of one or more other cells in a connection reestablishment procedure responsive to the determination, the prioritization based at least in part on the establishment of the second connection in the multi-carrier mode and the addition of the frequency and cell ID of the secondary cell to the acquisition database.

24. The non-transitory computer-readable medium of claim 23, wherein the instructions to establish the second connection are executable by the processor to establish additional connections with two or more secondary cells in multi-carrier mode, and wherein the instructions to prioritize are executable by the processor to prioritize one or more of the secondary cells ahead of one or more other cells in the connection reestablishment procedure.

25. The non-transitory computer-readable medium of claim 24, wherein the instructions are further executable by the processor to:

add a frequency and cell ID of each of the two or more secondary cells to the acquisition database of the UE following the establishment of the additional connections with the secondary cells;

release one of the additional connections associated with one of the secondary cells; and remove the frequency and cell ID of the released secondary cell from the acquisition database.

26. The non-transitory computer-readable medium claim 23, wherein the instructions are further executable by the processor to:

prioritize cells in the acquisition database for connection reestablishment attempts.

* * * * *